United States Patent
Muenkel et al.

(10) Patent No.: US 8,303,679 B2
(45) Date of Patent: Nov. 6, 2012

(54) FILTER CLOSURE SYSTEM

(75) Inventors: Karlheinz Muenkel, Oberderdingen-Flehingen (DE); Ralf Bauder, Ketsch (DE); Raphaelle Brast, Altlussheim (DE); Steffen Ritter, Stuttgart (DE); Michael Thienel, Kasendorf (DE); Carsten Schippers, Bielefeld (DE); Thomas Petschl, Ludwigsburg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 687 days.

(21) Appl. No.: 12/412,615

(22) Filed: Mar. 27, 2009

(65) Prior Publication Data
US 2009/0242476 A1  Oct. 1, 2009

(30) Foreign Application Priority Data
Mar. 27, 2008  (DE) .................... 20 2008 004 290 U

(51) Int. Cl.
*B01D 46/00* (2006.01)
(52) U.S. Cl. ............. 55/502; 55/507; 210/450; 210/453
(58) Field of Classification Search .................. 210/450, 210/453, 454, 459–462, 497.01; 55/492, 55/493, 502, 504, 507; 285/328–334.5
See application file for complete search history.

(56) References Cited

U.S. PATENT DOCUMENTS
3,652,110 A * 3/1972 Manton .................... 285/328

FOREIGN PATENT DOCUMENTS

| DE | 19718603 | | 11/1997 |
|---|---|---|---|
| DE | 19935503 | A1 | 2/2001 |
| DE | 19935504 | A1 | 2/2001 |
| FR | 2770593 | | 7/1999 |
| WO | WO01/54791 | | 8/2001 |
| WO | WO2008116672 | | 10/2008 |
| WO | WO2009037246 | | 3/2009 |

OTHER PUBLICATIONS

EP search EP09155907, 2009.
German Patent Office search report of foreign priority application, filed together with this IDS.

* cited by examiner

*Primary Examiner* — Duane Smith
*Assistant Examiner* — Thomas McKenzie
(74) *Attorney, Agent, or Firm* — James Hasselbeck

(57) ABSTRACT

A filter closure system has a connecting head with a connecting web and further has a connecting end at an end face of a filter housing. The connecting head and the connecting end are matched to one another. The connecting end is pushed onto the connecting head in a mounting direction into a mounted state on the connecting head so as provide a seal-tight connection in the mounted state. The connecting end and the connecting web that extends in the mounting direction are provided with a micro toothing. When pushing the connecting end onto the connecting head in the mounting direction, the micro toothing connects by positive locking action the connecting end and connecting head with one another. The engagement of the micro toothing between connecting end and connecting head is realized along a flank of connecting web and connecting end which flank extends in the mounting direction.

24 Claims, 2 Drawing Sheets

FILTER CLOSURE SYSTEM

CROSS REFERENCE TO RELATED APPLICATIONS

This application claims the benefit under 35 USC 119 of the earlier filing date of foreign application DE 20 2008 004 290.9 filed in Germany on Mar. 27, 2008.

TECHNICAL FIELD

The invention relates to a filter closure system for seal-tightly connecting the connecting end at the end face of a filter housing to a connecting head that matches the connecting end and onto which the connecting end can be pushed in a mounting direction.

BACKGROUND OF THE INVENTION

The invention relates to a filter closure system for seal-tightly connecting the connecting end at the end face of a filter housing to a connecting head that matches the connecting end and onto which the connecting end can be pushed in a mounting direction. Such a filter closure system serves for producing a pressure-tight and/or gas-tight and/or liquid-tight sealed connection between the filter housing and the connecting head. The invention is also directed to filter closure systems that are provided for mounting a filter or filter housing of the disposable type as well as those where the filter or filter housing is regularly replaced for maintenance or repair work.

A preferred field of application of such filter closure systems is stationary and movable compressed air devices. The compressors utilized in this field require oil for lubrication, for sealing and for cooling of the moving parts resulting in production of oil-containing gases. In order to recover most of this oil and in order to purify the compressed air by removing the oil, oil-removing elements are required that during maintenance work of the device must be regularly exchanged. These oil-removing elements are the filter elements of an appropriately configured filter arranged in a filter housing. Similar applications exist in connection with vacuum pumps.

Other applications of such filter closure systems are found in liquid filters that remove dirt particles or other components from a liquid, for example, oil filters, fuel filters, hydraulic medium filters, cooling medium filters, water separators or process filters for removing large amounts of contaminants from process liquids, in particular, in case of grinding, eroding or electrical discharge machining processes. Filter closure systems are also used in liquid separators that separate liquid or solid contaminants from a gas stream, in particular, in internal combustion engines, for example when cleaning oil-containing venting gases of the crankcase.

In areas such as oil filtration and removal of oil from air the filter closure system, the system must satisfy in particular the requirements in respect to pressure resistance and temperature resistance. Important features are also a simple, self-evident handling that prevents faulty operation and a cost-efficient production and/or disposal.

Filter closure systems established in the art are primarily based on threaded connections. Here, a filter housing, provided generally with a centrally arranged thread that is located on a terminal disk inserted into the filter housing, is screwed onto a matching threaded socket of the connecting head and by means of a sealing device, for example, an O-ring, a sealing action is achieved. Moreover, bayonet closures are known.

Based on these known devices, it is the object of the invention to provide a filter closure system in which in a simple way a seal-tight connection can be produced that enables a simple, self-evident manipulation that prevents faulty operation and that is cost-efficient with regard to production and/or disposal.

SUMMARY OF THE INVENTION

Disclosed herein is a filter closure system in which in a simple way a seal-tight connection can be produced that enables a simple, self-evident manipulation that prevents faulty operation and that is cost-efficient with regard to production and/or disposal. In accordance with the present invention, this is achieved in that the connecting end of the filter housing and a connecting web of a connecting head, which connecting web extends in the mounting direction, are provided with a micro toothing that upon pushing the connecting end onto the connecting head in the mounting direction, connects by positive-locking action of the micro toothing the connecting end with the connecting head, wherein the engagement of the micro toothing between the connecting end and the connecting head is realized along a flank of the connecting web and the connecting end, respectively, which flank extends in the mounting direction.

Expressed in a simple way, it is proposed to configure a filter closure in such a way that the parts to be connected are connected by two flanks with interlocking teeth. The parts are joined by simply pushing them together in the mounting direction, i.e., in the axial direction. In this connection, very small undercuts of the micro toothing provide minimal mounting forces. In order to be able to still realize sufficient holding forces, several sequentially arranged rows of grooves can be formed so that, as a whole, a micro toothed connection is produced.

A filter closure system according to the invention has the advantage that in a simple way a seal-tight connection is produced wherein a simple, self-evident handling is enabled that also prevents operating errors. Moreover, the production and/or disposal can be realized in an inexpensive way. Further advantages of the invention reside in the great load capacity and holding force of the high-strength connection that can be achieved even with minimal mounting forces. A fast mounting and demounting action can be achieved because, in contrast to conventional screw-on filters, it is not required to perform several turns of the filter for screwing it on or off. The closure system may be applied in a very tight space and at minimal cost and the realization of advantageous metal-free configurations for disposal of used filters including filter housing, filter element and closure system may be realized. Since, in contrast to the prior art devices, there is no need for a stable terminal disk with a centrally arranged thread at the end face of the filter in order to screw on the filter onto a threaded socket of the connecting head, the terminal disk of a filter can be designed to be substantially weaker, i.e. thinner and/or made from plastic material, in accordance with the filter closure system of the present invention.

Preferred embodiments and modifications of the invention can be taken from the dependent claims and the following description and drawings. The special features disclosed in the following can be used individually or in combination with one another in order to create preferred embodiments of the invention.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
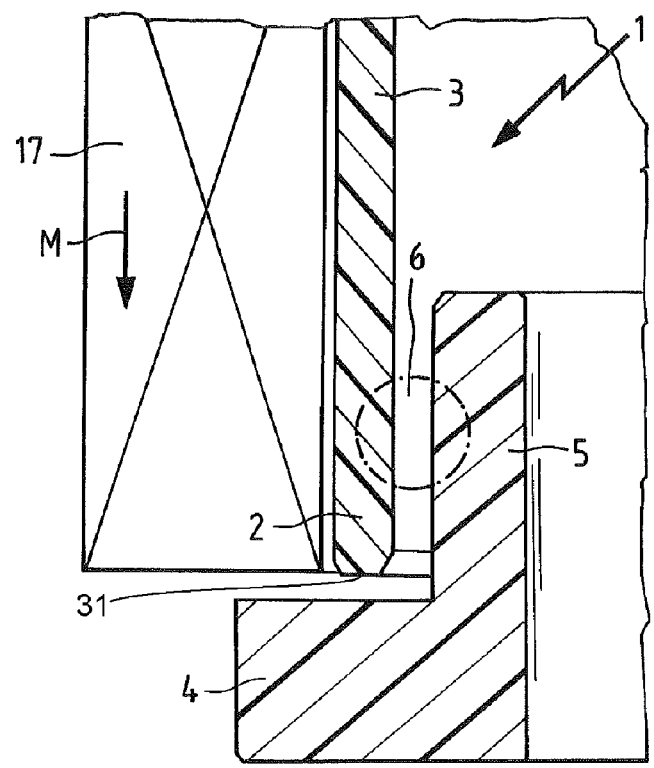
FIG. 1 shows a schematic section view of the filter closure system according to the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to filter closure systems. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a schematic illustration of a filter closure system 1 according to the invention for seal-tight connection of a connecting end 2 at the end face 31 of a filter housing 3 to a connecting head 4 that matches the connecting end 2 and onto which the connecting end 2 can be pushed in the mounting direction M. Only portions of the filter housing 3 with the connecting end 2 as well as the connecting head 4 are shown.

The connecting end 2 of the filter housing 3 and a connecting web 5 of the connecting head 4, which connecting web matches the connecting end 2 and extends in the mounting direction M, are provided with a micro toothing 6 that, when pushing the connecting end 2 onto the connecting head 4 or the connecting web 5 in the mounting direction M, connects by positive-locking engagement of the micro toothing 6 the connecting end 2 and the connecting head 4 or the connecting web 5 with one another. When doing so, the engagement of the micro toothing 6 between the connecting end 2 and the connecting head 4 or the connecting web 5 is realized across a flank that extends in the mounting direction M, i.e., along an area of the connecting web 5 and of the connecting end 2, respectively. The sealing action of the filter housing 3 relative to the connecting head 4 is realized by sealing means, not illustrated, for example, an O-ring.

When the interior of the filter housing 3 is located to the right of the illustrated wall section of the filter housing 3 or the connecting end 2 in FIG. 1, and e.g. also the axis of a circular-cylindrical filter housing, the connecting web 5 is arranged radially inwardly positioned relative to the connecting end 2 so that the connecting end 2 engages externally the connecting web 5 in the radial direction. This embodiment is preferred.

When the interior of the filter housing 3 is located to the left of the illustrated wall section of the filter housing 3 or the connecting end 2 in FIG. 1, and e.g. also the axis of the circular-cylindrical filter housing, the connecting web 5 is arranged in the radial direction outwardly relative to the connecting end 2 so that the connecting web 5 engages externally the connecting end 2 on the radial direction.

The connecting end 2, the filter housing 3 or the connecting web 5 can be made from, for example, soft metal or plastic (synthetic) material wherein hard plastic material is preferred. When the filter housing 3 is made from plastic material, in particular, in case of a metal-free filter insert 17, the disposal costs are low.

Figure 2:
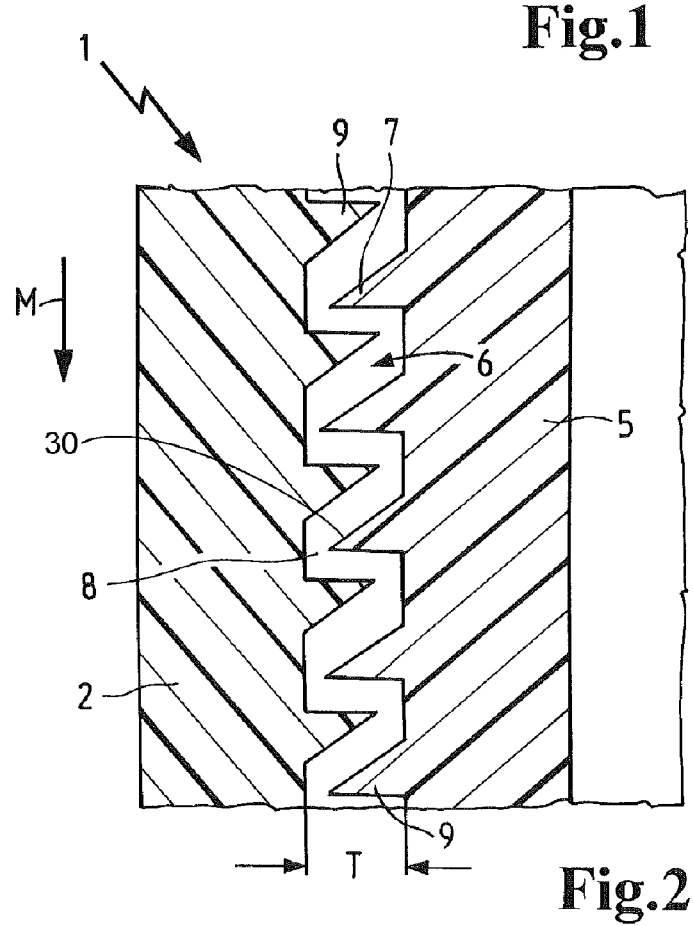
FIG. 2 shows a detail of FIG. 1.

The micro toothing 6 is not recognizable in FIG. 1 because of its minimal depth T and, therefore, FIG. 2 shows a detail view of the micro-toothing area (label 6 in FIG. 1) at a larger scale. The radial depth T of the micro toothing 6, depending on the application, can be typically between $\frac{1}{100}$ mm and 5 mm as a function of the desired holding force and the dimensions of the connecting end 2, the filter housing 3, and the connecting web 5 as well as the elastic properties of the materials from which these parts are manufactured.

The micro toothing 6 is preferably configured as a multi-row groove structure of projections 7 and corresponding depressions 8 wherein several rows of the groove structure are substantially arranged in the mounting direction M sequentially behind one another and transverse to the mounting direction M, i.e., in the radial direction they have a depth structure, i.e., a depth profile that extends in the mounting direction M is provided so that the engagement of the micro toothing 6 between the connecting end 2 and the connecting head 4 or connecting web 5 is realized along a flank of the connecting web 5 and of the connecting end 2, respectively, extending in the mounting direction M across several rows of grooves of the micro toothing 6. The groove structure of the micro toothing 6 is preferably arranged in a plane that extends perpendicularly to the mounting direction M.

In the embodiment illustrated in FIG. 2 the micro toothing 6 has radial projections 7, i.e., projections 7 that extend transversely to the mounting direction M, i.e., in a plane perpendicular to the mounting direction M, on the connecting web 5 and matching radial depressions 8 provided in the connecting end 2. Alternatively or additionally, it can also be provided that the micro toothing 6 is provided with radial projections 7 on the connecting end 2 and matching radial depressions 8 on the connecting web 5. In FIG. 2 a mixed form of the two variants is illustrated. The projections 7 and depressions 8 are preferably elongated, i.e., they extend across a circumferential section or across the entire circumference.

Advantageously, it can be provided that the rows of grooves of the micro toothing 6 in the mounting direction M are arranged so as to be positioned precisely behind one another, as illustrated in FIG. 2. In this connection, the connecting web 5, i.e., its flank that forms the micro toothing 6, extends exactly in the mounting direction M. In other embodiments, it can also be provided that the rows of grooves of the micro toothing 6 in the mounting direction M are radially displaced relative to one another, preferably at a spacing that increases in the mounting direction M. In this case, the flank between the connecting end 2 and connecting web 5 by means of which the engagement of the micro toothing is realized, would be slanted relative to the mounting direction. The connecting web 5 would thus be extending at an angle relative to the mounting direction M, preferably at a radial spacing that decreases in a direction opposite to the mounting direction.

The variant of the micro toothing 6 illustrated in FIG. 2 comprises angular projections 7 and or angular depressions 8. In this connection, it can be provided in particular that the micro toothing 6 has snap hook geometry, a barb geometry or undercut geometry. In FIG. 2, the micro toothing 6 has teeth 9 whose first flank is slanted in or opposite to the mounting direction M and whose second flank is oriented transversely to the mounting direction M. Because of the slant, the pushing action of the connecting end 2 onto the connecting web 5 is facilitated because the slant produces a transverse force that radially spreads open the connecting end 2. Upon surpassing the greatest gap width of the micro toothing 6 wherein the tips of teeth 9 rests against one another the surfaces of the teeth 30 that are transversely positioned to the mounting direction M engage one another and generate a barb effect against a return action of the connecting end 2 opposite to the mounting direction M. Of course, the strength of the holding force can be realized by different orientations, i.e., slants or undercuts of the oppositely positioned groove structure. The locking effect of the micro toothing 6 is moreover particularly high when the rows of the micro toothing 6 in the mounting direction M are positioned substantially at the same spacing relative to one another.

Figure 3:
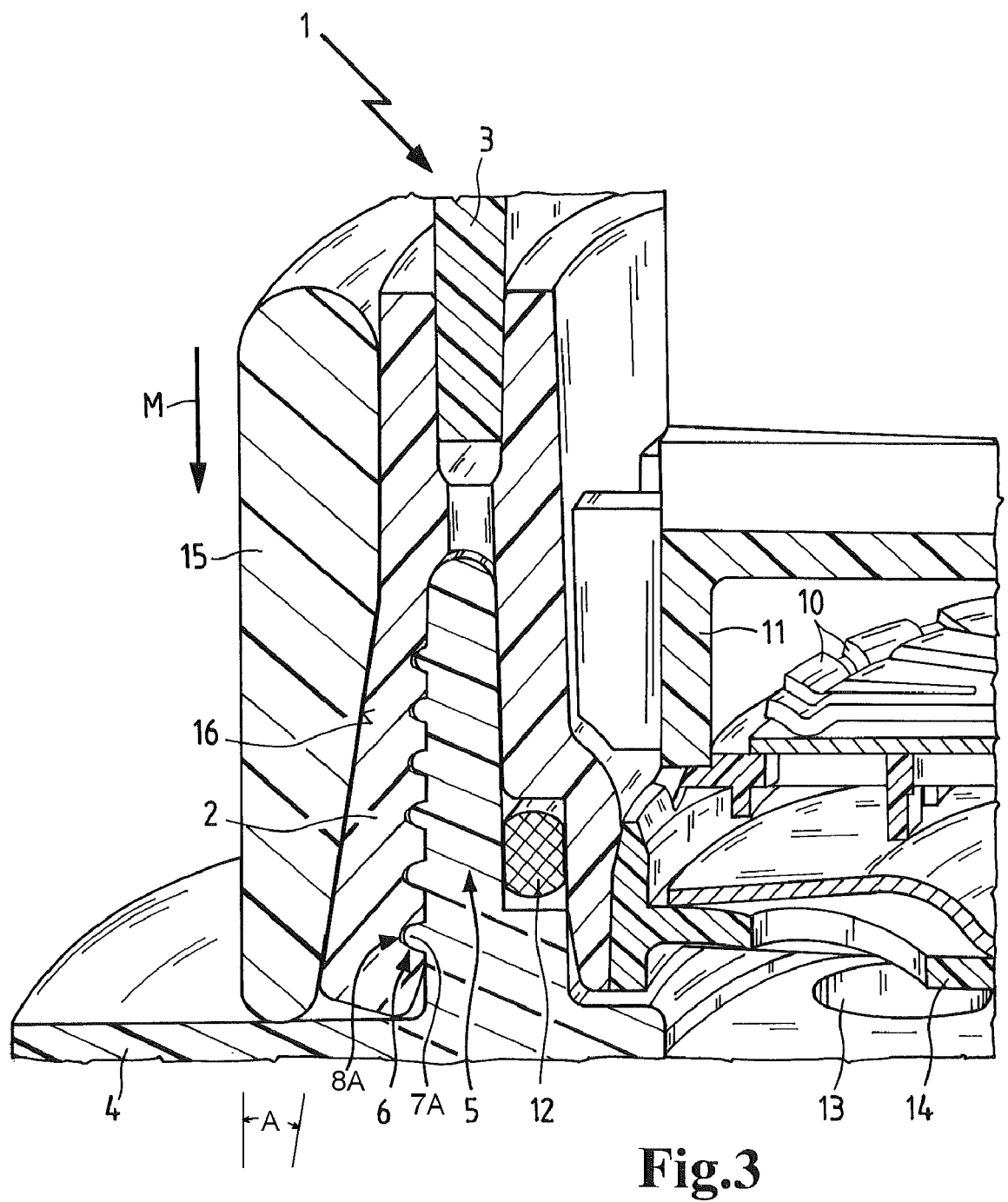
FIG. 3 shows a section view of a specific embodiment of the filter closure system according to the invention.

In FIG. 3 a specific embodiment of a filter closure system according to the invention is shown, for example, for an oil filter. The filter housing 3 and the connecting head 4 are illustrated in partial section view. The filter housing 3 is embodied as a cylinder, for example, as a filter cup or filter pot. Preferably, the filter housing 3 has the shape of a circular cylinder. In the interior of the filter housing 3 there is a filter insert 17 (see in particular FIG. 1). By means of the filter closure system 1 according to the invention the filter that is comprised of the filter housing 3 and the filter insert 17 is connected seal-tightly to the connecting head 4. Within the filter housing 3 a check valve housing 11 is provided; a bypass valve spring 10 is arranged in the housing 11. The filter closure system ensures the mechanical connection and the sealing action is provided by means of one or several O-rings 12. As shown in FIG. 3, the filter housing (3) at the connecting end (2) includes a radially inwardly positioned inner connection member engaging an opposing side of the connecting head (5) relative to the micro toothing. The sealing O-ring 12 is arranged between the inwardly positioned inner connection member and the connecting head.

The fluid exchange between connecting head 4 and the filter is realized by one or several openings 13 that are provided in alignment with one another in the connecting head 4 and the terminal disk 14 of the filter.

The connecting web 5 is embodied so as to extend substantially circumferentially, i.e., it forms preferably a substantially circular web. The connecting end 2 is formed as an extension of the end of the filter housing 3 and engages the connecting web 5 in a radial direction from the exterior of the filter housing 3. The micro toothing 6 that is formed between the inner side of the connecting end 2 and the exterior side of the connecting web 5 has, in deviation from the square embodiment illustrated in FIG. 2, rounded projections 7A and rounded depressions 8A. The holding force of such a micro toothing 6 is therefore somewhat reduced in comparison to the embodiment illustrated in FIG. 2.

In order to realize in the embodiment illustrated in FIG. 3 a fixed connection between the filter housing 3 and the connecting head 4, two additional measures are provided that can also be used in connection with the embodiment illustrated in FIG. 2.

On the one hand, the micro toothing 6 is embodied in the connecting end 2 and/or in the connecting web 5 in the direction of the mounting direction M in such a way that its radial depth T (see FIG. 2) is greater at a smaller spacing relative to the connecting head 4 than at a larger spacing relative to the connecting head 4 (the radial depth decreases with increasing distance from the connecting head). In this way, the force required for pushing the connecting end 2 onto the connecting web 5 increases in the mounting direction M with increasing length of the flank extending in the mounting direction M by means of which flank the engagement of the micro toothing 6 is realized. Such a progressive course of the mounting force can be expedient in order to ensure that a defined position of the connected parts is ensured.

According to a further advantageous feature it can be provided that the micro toothing 6 is formed with a radial depth T that uniformly increases in the mounting direction M. In an advantageous embodiment, it can be provided that the radial depth T of the micro toothing 6 increases by more than 10%, 30%, 50%, 70%, 90%, 110% or 130%.

As a second means for improving the mechanical connection between filter housing 3 and connecting head 4 the filter closure system 1 comprises a securing element 15 that engages the closure realized by the micro toothing 6 in a radial direction outwardly in a positive-locking way and that exerts onto the micro toothing 6 a radially acting clamping force that reinforces and/or secures the engagement of the micro toothing 6. In case of very great connecting forces, the additional securing element 15 can ensure the required holding force or long-term stability.

The securing element 15 is mounted after the connecting end 2 has been pushed onto the connecting web 5 by means of the micro toothing 6 and substantially strengthens the connection realized by the micro toothing 6 as a result of elastic properties of the connecting end 2 and/or of the connecting web 5. The securing element 15 is preferably made from a high-strength material with minimal elastic properties, for example, metal or a high-strength plastic material.

According to a preferred embodiment, the securing element 15 has in the mounting direction M a slant 16 so that the radial diameter of the securing element 15 in a direction opposite to the mounting direction M is reduced. The exterior of the closure that is engaged by the securing element 15 and is formed by the connecting end 2 and connecting web 5 has a matching slant. The angle A at which the slant 16 is positioned relative to the mounting direction M is advantageously more than 5 degrees, 10 degrees, 15 degrees, 20 degrees, 25 degrees, 30 degrees, 35 degrees 45 degrees, or 50 degrees. The conical shape of the securing element 15 prevents disengagement of the micro toothing 6 as may otherwise occur under extreme load due to elastic widening.

The securing element 15 itself can be attached in different ways. In a first embodiment, the securing element 15 can be configured, for example, as a push-on bushing to be pushed on in the mounting direction M or as clamping element, as illustrated in FIG. 3. In this connection, the securing element 15 can be designed to be self-locking by an appropriate frictional connection so that it cannot accidentally become detached after having been pushed on. In other embodiments, not illustrated in FIG. 3, the securing element 15 can have a securing device for attachment of the securing element 15 on the connecting end 2 and/or on the connecting head 4, for example, a thread for screwing on in accordance with a lock nut or a bayonet closure.

The filter closure system 1 can be opened again in order to remove a filter housing 3 connected to the connecting head 4, for example, in order to replace the filter insert 17. For this purpose, first a securing element 15 that may be present is released or removed and, subsequently, the filter housing 3 with the filter end 2 is pulled off in a direction opposite to the mounting direction M. Should in this situation a very great force be required, the detachment of the micro toothing 6 can be facilitated when the filter housing 3 is slightly canted or rotated.

Generally, the micro toothing 6 is designed to extend substantially continuously in the circumferential direction, i.e., the grooves of the micro toothing 6 form substantially complete circles. In other embodiments, in particular for facilitating release of the closure, the micro toothing 6 can also be segmented in the circumferential direction and interrupted. In this case, the connecting end 2 can also have at its end facing the connecting head 4 one or several slots extending in the mounting direction M. Such axial slots facilitate spreading (widening) of the connecting end 2 upon removal of the filter housing 3 from the connecting head 4. In such variants the use of a securing element 15 is thus particularly advantageous.

The described closure system with a micro toothing 6 not only can serve for seal-tight connection of filters with a connecting head 4 but is also suitable in principle for producing any kind of mechanical connection with or without sealing function, in particular when parts in a tight or confined space are to be connected in a cost-effective way and with a high-strength connection. Such connections can be, for example, connections of housing parts or pipelines (conduits).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A seal-tight filter closure system comprising:
   a connecting head having a connecting web;
   a connecting end at an end face of a filter housing,
   wherein said connecting head and said connecting end are matched to one another and
   wherein said connecting end is pushed onto said connecting head in a mounting direction into a mounted state on said connecting head,
   wherein said connecting end and said connecting head form a seal-tight connection in said mounted state;
   wherein said connecting end and said connecting web of said connecting head, which connecting web extends in the mounting direction, are provided with micro toothing;
   wherein said micro toothing, when pushing said connecting end onto said connecting head in said mounting direction, connects by positive locking action said connecting end and said connecting head with one another; and
   wherein an engagement of said micro toothing between said connecting end and said connecting head is realized along a flank of said connecting web and said connecting end, respectively, said flank extending in said mounting direction,
   wherein said micro toothing is a multi-row groove structure comprising projections and matching depressions,
   wherein said groove structure comprises several grooves that are arranged in rows substantially sequentially behind one another in said mounting direction and, transverse to said mounting direction, have a depth structure in a radial direction so that said several grooves of said micro toothing provide said engagement between said connecting end and said connecting head in said mounting direction along said flank,
   wherein said radial depth of said multi-row groove structure in said connecting head and connecting end decreases along said flank with increasing distance from said connecting head, said decreasing radial depth of said groove structure in said mounting direction operable to provide an increasing progressive course of mounting force as said connecting end and said connecting head progressively engage in said mounting direction into said mounted state, said decreasing radial depth of said groove structure in said mounting direction resulting a deepest projection engaging a deepest depression of said multi-row groove structure when in said mounted state.

2. Filter closure system according to claim 1, wherein said filter housing is cylindrical and shaped as a filter cup or a filter pot.

3. Filter closure system according to claim 1, wherein said connecting web is substantially circular and extends substantially about the circumference of said connecting head.

4. Filter closure system according to claim 1, wherein said connecting web is positioned as one of:
   positioned radially inwardly relative to said connecting end such that said connecting end engages said connecting web externally in a radial direction, or
   positioned radially outwardly relative to said connecting end such that said connecting web engages said connecting end externally in a radial direction.

5. Filter closure system according to claim 1, wherein said grooves of said micro toothing in the mounting direction substantially have the same spacing relative to one another.

6. Filter closure system according to claim 1, wherein said rows of said grooves of said micro toothing in said mounting direction are displaced relative to one another, preferably at a radial spacing that increases in said mounting direction.

7. Filter closure system according to claim 1, wherein said connecting web extends at an angle relative to said mounting direction, preferably such that a radial spacing decreases in a direction opposite to said mounting direction.

8. Filter closure system according to claim 1, wherein said micro toothing has radial projections on said connecting head and matching radial depressions in said connecting end.

9. Filter closure system according to claim 1, wherein said micro toothing comprises any of: rounded projections and rounded depressions, angular projections and angular depressions.

10. Filter closure system according to claim 1, wherein said radial depth of said micro toothing increases uniformly in said mounting direction.

11. Filter closure system according to claim 1, wherein said radial depth of said micro toothing increases by more than 10%, 30%, 50%, 70%, 90%, 110%, or 130%.

12. Filter closure system according to claim 1, wherein said micro toothing is segmented in a circumferential direction and interrupted.

13. Filter closure system according to claim 1, wherein said connecting end at an end facing said connecting head has one or several slots extending in said mounting direction.

14. Filter closure system according to claim 1, wherein at least one of said connecting end and said connecting web is comprised of soft metal or plastic material.

15. Filter closure system according to claim 1, comprising a securing element that radially outwardly engages positive-lockingly said micro toothing and acts radially by a clamping force onto said micro toothing so as to reinforce and/or secure said engagement of said micro toothing, said securing element frictionally engaging against and compressing against one of said connecting head and connecting end.

16. Filter closure according to claim 15, wherein said securing element has a slant extending in said mounting direction so that a radial diameter of said securing element in a direction opposite to said mounting direction decreases and an outer side of said connecting end or said connecting head which outer side is engaged by said securing element has a matching slant.

17. Filter closure system according to claim 16, wherein said slant has an angle relative to said mounting direction that is greater than 5 degrees, 10 degrees, 15 degrees, 25 degrees, 30 degrees, 35 degrees, 45 degrees or 50 degrees.

18. Filter closure system according to claim 15, wherein said securing element is a push-on bushing pushed on in said mounting direction or a clamping element.

19. Filter closure according to claim 15, wherein said securing element is self-locking.

20. Filter closure system according to claim 15, wherein said securing element comprises a securing device for attaching said securing element
on said connecting end;
on said connecting head; or
on said connecting head and said connecting end.

21. Filter closure system according to claim 20, wherein said securing device of said securing element comprises a thread or a bayonet closure for attaching said securing element.

22. Filter housing of a filter comprising
a filter closure system with a micro toothing according to claim 1.

23. Filter comprising
a filter housing and
a filter insert disposed in said filter housing, comprising a filter closure system with a micro toothing according to claim 1.

24. Filter closure system according to claim 15, comprising said filter housing at said connecting end comprises a radially inwardly positioned inner connection member, said connection member engaging an opposing side of said connecting head relative to said micro toothing,
wherein a sealing ring is arranged sealing between said inwardly positioned inner connection member and said connecting head.

* * * * *